Jan. 16, 1962 J. Q. BATDORF 3,016,722
SLIP JOINT SEAL
Filed May 26, 1959
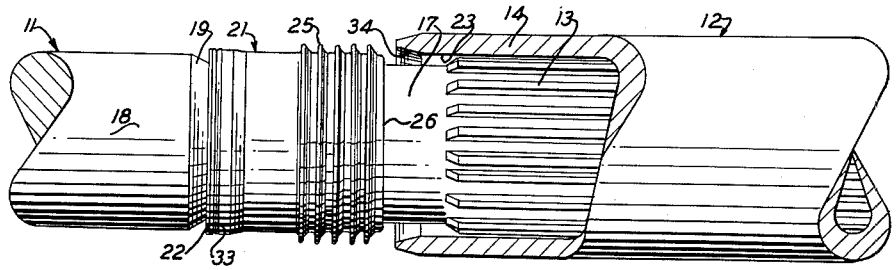
FIG. 1
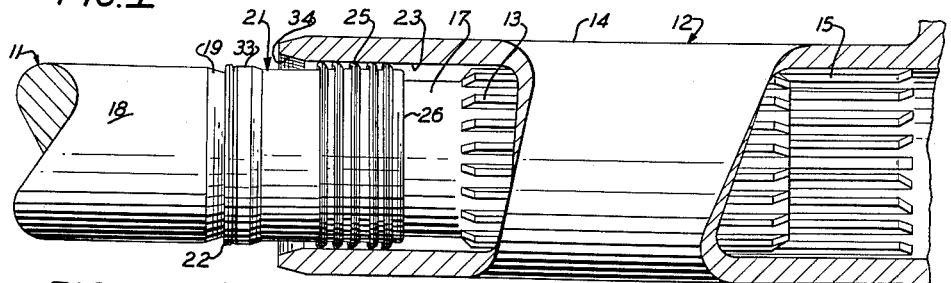
FIG. 2
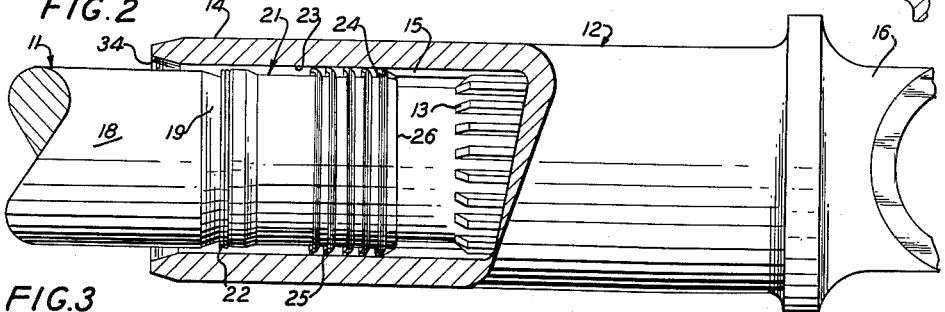
FIG. 3
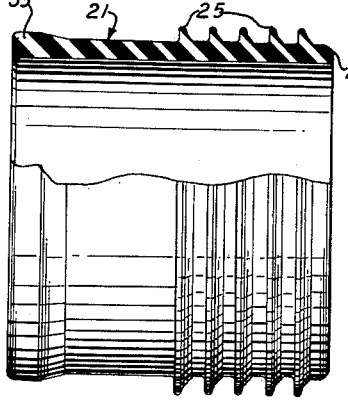
FIG. 4
FIG. 5
J. Q. BATDORF
INVENTOR.
BY J. R. Faulkner
J. J. Roethel
ATTORNEYS 3,016,722
SLIP JOINT SEAL John Q. Batdorf, Allen Park, Mich., assignor to Ford Motor Company, Dearborn, Mich., a corporation of Delaware Filed May 26, 1959, Ser. No. 815,924
3 Claims. (Cl. 64—23)

This invention relates to slip joints for automotive vehicle drivelines and more particularly to an improved grease seal and housing therefor at the slip joint operatively coupling the transmission output shaft to the driveshaft.

A noise condition known as "spline-grunt" has been quite noticeable in the drivelines of automobiles of recent design. This condition is caused by poor mating of the driveshaft slip yoke and transmission output shaft splines such that the slip yoke does not slip freely fore and aft or axially of the driveline as it is expected to do during normal acceleration and deceleration of the vehicle.

The problem is particularly noticeable during acceleration of the vehicle. When the vehicle is accelerated, the slip yoke should move forward on the output shaft. Instead, because of static friction accentuated by the poor mating condition, an extremely high loading of the splines occurs and the slip yoke is rendered axially immovable. If the vehicle hits a slight bump effective to jar the driveline at this point, the slip yoke breaks loose and moves forward suddenly, causing a loud noise. This noise is known as "spline-grunt."

The foregoing condition may be overcome by lubricating the splines with chassis grease, or other suitable heavy lubricants. However, this ordinarily is only a temporary expedient since the heavy lubricant is washed off the splines by the automatic transmission fluid after a very few miles of operation. It is an object of the present invention to provide an improved seal and slip yoke design effective to prevent the automatic transmission fluid from reaching the output shaft and slip yoke splines and thus render the heavy lubricant immune to dilution.

Other objects and advantages of this invention will be made more apparent as this description proceeds, particularly when considered in connection with the accompanying drawing, wherein:

FIG. 1 is a fragmentary view in part sectional illustrating the slip yoke in a full rebound or maximum rearward position.

FIG. 2 is a fragmentary view in part sectional illustrating the slip joint in a normal position of operation.

FIG. 3 is a fragmentary view in part sectional illustrating the slip joint in a full jounce or maximum forward position.

FIG. 4 is a side elevation in part sectional of the grease seal embodied in the present invention.

FIG. 5 is an enlarged fragmentary view of a portion of the grease seal illustrating the sealing lips on the cylindrical surface thereof.

Referring now to FIGS. 1 to 3 inclusive, the slip joint is illustrated as comprising a driving element 11 and a driven element 12. In the embodiment of the invention illustrated herein, the driving element comprises the transmission output shaft and the driven element comprises the driveshaft slip yoke. The driving element 11 is provided at the one end thereof, the right end as viewed in the drawings, with external splines 13. The driven element 12 is provided at one end with a tubular portion 14 having internal splines 15. At its other end the driven member 12 is provided with the yoke element 16 of a universal joint device (not shown) through which the slip yoke is coupled to a driveline member such as a driveshaft.

It will be noted that the driving element 11 is provided with an undercut portion 17 to the left of the external splines 13, as viewed in the drawings. The main body section 18 of the driving member 11 and the undercut portion 17 are connected by a tapered shoulder 19.

The undercut portion 17 of the driving member 11 is adapted to receive the improved grease seal embodied in the present invention. The grease seal, generally designated 21, is moulded of a suitable synthetic rubber. Interposed between the tapered shoulder 19 and the grease seal 21 is a suitable, flat, spring steel retaining ring 22.

The tubular portion 14 of the driven member 12 is suitably counterbored at 23 to a substantial depth. As best seen in FIG. 3, the internal splines begin at the base of the counterbore. When the grease seal is at its most extreme inward position, as shown in FIG. 3, there is a slight amount of clearance between the end 24 of the splines 15 and the end of the seal.

As best seen in FIGS. 3 and 4 the grease seal 21 comprises a synthetic rubber sleeve or tubular member. At its right end, as viewed in the drawings, it is provided with a plurality of equally spaced circumferential ribs or sealing lips 25. The first of these lips 25 is spaced inwardly of the right end 26 of the seal and the remaining lips are spaced at substantially equal intervals inwardly therefrom. As best seen in the enlarged view, FIG. 5, each lip is provided with a rounded wiping edge 27. On one side 28 each lip is substantially flat, that is, the plane of the side is normal to the longitudinal axis of the seal. A very slight radius is provided at the intersection 29 of the side 27 of the lip and the periphery of the sleeve. On the side opposite its side 28, each lip is provided with a compound angle surface to provide for reinforcement and to control the direction of flexing of the seal in operation. As best seen in FIG. 5, the compound angle side includes a section 31 at a relatively flat angle to the plane normal to the longitudinal axis of the sleeve and a section 32 which is at a substantial angle to the plane normal to the longitudinal axis of the sleeve. In a prototype structure the angle of the section 31 was approximately 15 degrees and the angle of the section 32 was approximately 45 degrees to the plane normal to the longitudinal axis of the sleeve.

It will be noted that the grease seal is provided at its left end, as viewed in FIG. 4, with a thickened tapered end portion 33. This thickened portion provides reinforcement for the seal at the area of contact with the retaining ring.

In normal operation or when at rest, the relationship of the seal is as illustrated in FIG. 2. The outer diameter of the lips 25 is slightly greater than the internal diameter of the counterbore 23 so that the lips are tilted or flexed slightly at an angle to their normal free position. Because of the structural reinforcement of the lips on the one side, the angle of tilt is normally in the direction of the transmission or away from the splines as viewed in FIG. 2. When the vehicle is accelerated, the slip yoke or driven member 12 moves relative to the transmission output shaft. The direction of movement is forwardly along the transmission output shaft so that a condition as shown substantially in FIG. 3 is obtained, although it will be understood that the FIG. 3 condition is a maximum forward position of the slip yoke on the transmission output shaft. Any grease on the internal surfaces of the slip yoke will be wiped forwardly in the direction of the splines and any transmission oil attempting to follow the seal into the yoke tubular portion 14 will be effectively barred or sealed out by the lips 25. As the relative movement of the driving member and driven member becomes such that the normal position shown in FIG. 2 is again attained, the sealing lips will wipe any transmission oil from the interior of the tubular portion 14 of the driven member back toward the transmission.

FIG. 1 illustratts the maximum rearward position of the driven member or driveshaft slip yoke relative to the driving member or transmission output shaft. In actual operation, the condition illustrated in FIG. 1 is not attained. The grease seal 21 does not fully withdraw from the counterbore of the tubular portion 14 of the driven member or driveshaft slip yoke 12. The sealing lips are effective to provide a barrier for the retention of the grease on the splines and for preventing the transmission oil from acting as a diluent of the grease. The condition illustrated in FIG. 1 would only appear as the transmission output shaft and driveshaft slip yoke were assembled to each other. It is noted that the counterbore is provided with a chamfer or tapered entrance portion 34 to provide easy entrance of the grease seal into the counterbore.

It has been found that the combination of the slip yoke and grease seal as embodied in the present invention has eliminated a substantial part of the difficulty involving "spline-grunt."

It will be understood that the invention is not to be limited to the exact construction shown and described, but that various changes and modifications may be made without departing from the spirit and scope of the invention as defined in the appended claims.

What is claimed is:

1. A driveline slip joint comprising a driving element and a driven element, said driving element being telescoped into one end of said driven element, said elements respectively having intermeshing externally and internally splined portions forming a driving connection therebetween, said splines being effective to maintain said driving connection upon limited relative axial displacement of said elements, said driven element having a counterbored portion between its one end and said internal splines, said driving element having a reduced portion axially inwardly of said external splines, a sealing member encompassing said reduced portion of said driving element, external sealing means on said member in internal engagement with the counterbored portion of said driven element, said external sealing means comprising a plurality of axially spaced lips, and means interposed between said lips and the surface of said sealing member controlling the direction in which said lips flex during sealing engagement with the surface of said counterbored portion.

2. A drive line slip joint comprising a driving element and a driven element, one of said elements having an end portion telescoped into an end portion of the other of said elements, said end portions respectively having intermeshing externally and internally splined portions forming a driving connection therebetween, said splines being effective to maintain said driving connection upon relative axial displacement of said elements, the external splines on said one element terminating at a reduced cylindrical portion inwardly of its one end and the internal splines on the other element being displaced inwardly of its one end to provide an annular space between parts of said end portions when said splines are intermeshed, a tubular sealing member within said annular space encompassing said reduced cylindrical portion of said one element, external sealing means on said tubular member in internal engagement with said other element between its internal splines and its one end, said tubular member external sealing means comprising a plurality of axially spaced lips effective to isolate said intermeshed splines from lubricant diluents attempting to enter said slip joint from said one element end thereof, and means interposed between said lips and the surface of said tubular member controlling the direction in which said lips flex when in said internal engagement with said other element.

3. A driveline slip joint comprising a driving element and a driven element, said driving element having an end portion telescoped into an end portion of one end of said driven element, said element and portions respectively having intermeshing externally and internally splined portions forming a driving connection therebetween, said splines being effective to maintain said driving connection upon limited relative axial displacement of said elements, the external splines on said driving element terminating at a reduced cylindrical portion inwardly of its one end and the internal splines on the driven element being displaced inwardly of its one end to provide a concentric space between parts of said end portions when said splines are intermeshed, a tubular sealing member encompassing said reduced portion of said driving element, external sealing means on said tubular member in internal engagement with said driven element between its internal splines and its one end, said tubular member being positioned within said concentric space and the external sealing means thereon comprising a plurality of axially spaced lips effective to isolate said intermeshed splines from lubricant diluents attempting to enter said slip joint from said driving element end thereof, and means interposed between said lips and the surface of said tubular member controlling the direction in which said lips flex when in said internal engagement with said driven element.

References Cited in the file of this patent

UNITED STATES PATENTS

| | | |
|---|---|---|
| 1,397,413 | Evans | Nov. 15, 1921 |
| 1,973,702 | Cooke | Sept. 18, 1934 |
| 2,265,615 | Stalter | Dec. 9, 1941 |
| 2,271,777 | Nathan | Feb. 3, 1942 |
| 2,839,902 | Glover | June 24, 1958 |
| 2,861,435 | Seanor | Nov. 25, 1958 |